US 8,578,800 B2

(12) United States Patent
Brandenburg et al.

(10) Patent No.: US 8,578,800 B2
(45) Date of Patent: Nov. 12, 2013

(54) HYDRAULIC CONTROL ARRANGEMENT FOR AN AUTOMATED SHIFT TRANSMISSION

(75) Inventors: Markus Brandenburg, Esslingen (DE); Benjamin Kemmner, Unterensingen (DE); Jörg Schindler, Bietigheim-Bissingen (DE)

(73) Assignee: Daimler AG, Stuttgart (DE)

( * ) Notice: Subject to any disclaimer, the term of this patent is extended or adjusted under 35 U.S.C. 154(b) by 277 days.

(21) Appl. No.: 13/136,122

(22) Filed: Jul. 22, 2011

(65) Prior Publication Data

US 2011/0314945 A1 Dec. 29, 2011

Related U.S. Application Data

(63) Continuation-in-part of application No. PCT/EP2009/009041, filed on Dec. 16, 2009.

(30) Foreign Application Priority Data

Jan. 23, 2009 (DE) .................... 10 2009 005 753

(51) Int. Cl.
*F16H 3/08* (2006.01)
*F16H 59/00* (2006.01)
*F16H 61/00* (2006.01)
*F16H 63/00* (2006.01)

(52) U.S. Cl.
USPC .............................................. 74/330; 74/335

(58) Field of Classification Search
USPC .................................................... 74/330, 335
See application file for complete search history.

(56) References Cited

U.S. PATENT DOCUMENTS

| 6,631,651 | B2* | 10/2003 | Petrzik ........................... 74/346 |
| 7,395,908 | B2* | 7/2008 | Hegerath et al. ............ 192/3.58 |
| 2004/0074732 | A1* | 4/2004 | Busold et al. ............... 192/87.13 |
| 2007/0137973 | A1* | 6/2007 | McCunn et al. ........... 192/87.13 |
| 2008/0127760 | A1 | 6/2008 | John et al. |

FOREIGN PATENT DOCUMENTS

| DE | 101 43 833 | 3/2003 |
| DE | 10 2004 031 021 | 1/2006 |
| DE | 100 2006 181 | 8/2007 |
| EP | 1 420 185 | 5/2004 |
| EP | 1 420 186 | 5/2004 |
| JP | 63-154844 | 10/1988 |
| JP | 2008 133856 | 5/2005 |
| JP | 2011 546606 | 5/2010 |
| JP | 2011 508169 | 3/2011 |

\* cited by examiner

*Primary Examiner* — Ha D Ho
*Assistant Examiner* — Emily Cheng
(74) *Attorney, Agent, or Firm* — Klaus J. Bach

(57) ABSTRACT

In a hydraulic control arrangement for an automated shift transmission, in particular a dual clutch transmission in a motor vehicle including a hydraulic control arrangement, the hydraulic control arrangement has a main pump and a controllable additional pump which jointly ensure that oil is supplied to the hydraulic control arrangement. The additional pump can feed into a control channel of a lubricating pressure slide and build up an adjustable lubricating fluid control pressure. The lubricating fluid pressure in the lubricating cooling system is adjusted in a simple and inexpensive manner by lubricating pressure slide changes modifying the lubricating control pressure in the lubricating cooling system.

16 Claims, 3 Drawing Sheets

HYDRAULIC CONTROL ARRANGEMENT FOR AN AUTOMATED SHIFT TRANSMISSION This is a Continuation-In-Part of pending international patent application PCT/EP2009/009041 filed Dec. 16, 2009 and claiming the priority of German patent application 10 2009 005 753.6 filed Jan. 23, 2009.

BACKGROUND OF THE INVENTION

The invention relates to a hydraulic control arrangement for an automated shift transmission, particularly a dual clutch transmission of a motor vehicle with a lubricant cooling system including a main pump and a controllable pump providing for the oil supply to the hydraulic control arrangement.

DE 10 2006 006 181 A1 describes a hydraulic control device for an automated transmission of a motor vehicle. The hydraulic control device has a lubricating cooling system, by means of which a start-up clutch designed as a wet running multiple disk clutch can be cooled. The hydraulic control device has a lubricating pressure slide, by means of which the pressure in the lubricating cooling system can be adjusted. The lubricating pressure is thereby adjusted in dependence on a torque present in the power train. The hydraulic control device has an actuatable pressure control valve for this, which adjusts a lubricating control pressure in the form of a pre-control pressure at the lubricant pressure slide.

EP 1 420 185 A2 describes a hydraulic control for an automated transmission of a motor vehicle. The hydraulic control has two pumps, wherein a first pump only feeds into a lubricating cooling system. A control valve can apply a control pressure to a volume flow regulation valve of the lubricating cooling means, whereby the volume flow in the lubricating cooling system can be adjusted or reduced. A system pressure generated by the second pump serves as input pressure of the control valve.

It is the object of the invention to provide a hydraulic control arrangement for an automated gear shift transmission, which makes an adjustment of lubricant pressure for a plurality of functionalities possible with a relatively small number of slides and control valves.

SUMMARY OF THE INVENTION

In a hydraulic control arrangement for an automated shift transmission, in particular a dual clutch transmission in a motor vehicle, the hydraulic control arrangement has a main pump and a controllable additional pump which jointly ensure an appropriate oil supply to the hydraulic control arrangement. The additional pump can feed into a control channel of a lubricating fluid pressure slide and thus build up a lubricating control pressure. The lubricating pressure in the lubricating cooling system is adjusted by the lubricating pressure slide by modifying the lubricating control pressure for adjusting a lubricating fluid pressure in the lubricating cooling system which is adjustable in a simple and inexpensive manner.

The main pump is particularly mechanically coupled to a drive machine, for example an internal combustion engine of the motor vehicle, and is driven thereby. The feed amount of the main pump depends in this case on the speed of the drive machine. The additional pump is particularly driven by an electric motor under the control of an electronic control device, with which the feed amount of the additional pump can be adjusted by changing the speed of the electric motor and can particularly also be reduced to zero. The additional pump can thereby support the main pump with the supply of the hydraulic control device and particularly also supply the hydraulic control device with oil while the drive machine is shut down. A so-called start-stop operation of the motor vehicle is made possible thereby, where; in situations in which no power of the drive machine is needed, it is shut down automatically and subsequently started again.

The additional pump can feed into a control channel of the lubricating pressure slide and thus build up a lubricating fluid control pressure. By the modification of the lubricating fluid control pressure, the lubricating pressure adjusted by the lubricating pressure slide also changes in the lubricating cooling system. The lubricating fluid control pressure can thereby be changed in a simple and cost-efficient manner and the lubricating fluid pressure thus be adjusted as desired.

The automated transmission is particularly in the form of a dual clutch transmission. It can however for example also be designed as an automated shift transmission, an automatic transmission with planetary gears or a stepless transmission.

The lubricating pressure slide is particularly designed in such a manner that the adjusted lubricating pressure increases with increasing lubricating control pressure, a lower limit of the lubricating pressure being fixed by a spring. Thereby, particularly the lubricating pressure and also the available lubricating oil amount are increased, when the additional pump feeds oil and thus increases the lubricating control pressure. As the additional pump is particularly activated when an increased cooling and lubricating requirement is present, the lubricating pressure is also increased in these situations.

In one arrangement of the invention, the lubricating cooling system has a first, actuatable cooling slide, by means of which a connection between the control channel of the lubricating pressure slide and the additional pump can be made and separated. The additional pump can thereby also be activated necessarily, without affecting the lubricating pressure slide and thus the lubricating fluid pressure. The additional pump can particularly also feed oil without the lubricating pressure being increased. This is particularly necessary for supplying oil to the hydraulic control device in stop phases during a start-stop operation. In such a stop phase, thus with the drive machine shut down, it is not necessary that the lubricating pressure is increased. This would only lead to an increased oil requirement, which would also have to be covered by the additional pump.

Preferably, the lubricating cooling system is supplied with an oil volume flow from the main pump via a supply channel. It has an additional oil channel, via which an additional oil volume flow can flow from the additional pump into the lubricating cooling system. The control channel of the lubricating pressure slide thereby corresponds at least partially to the additional oil channel. Thereby, a single channel can be used for the control channel and the additional oil channel at least partially, which permits a simple channel layout in the hydraulic control device. In the additional oil channel is particularly arranged a non-return valve in such a manner that oil can only flow from the additional pump to the lubricating cooling system and not vice versa.

In an arrangement of the invention, a second cooling channel arranged parallel to the first cooling channel can be opened and closed with the first actuatable cooling slide. Thereby, a very high cooling oil amount can be delivered to the start-up clutch in the case of a high loss performance at the start-up clutch by opening the second cooling channel. If the cooling oil requirement is not high, the second cooling channel can be closed and cooling oil is not supplied to the start-up clutch in an unnecessary manner.

In addition to an open and a closed position of the second cooling channel, the adjustment of an intermediate position is also conceivable, wherein "opened" does not necessarily have to mean completely open and "closed" not necessarily completely closed. The cooling slide can for example be actuated by a magnetic valve, which may be in the form of a shift valve or a magnetic control valve.

In an arrangement of the invention, a return channel, via which an oil volume flow can flow from the lubricating cooling system to an intake side of a pump of the hydraulic control device, can be opened and closed by means of the first cooling slide. The pump supplies the hydraulic control device with oil, wherein the hydraulic control device can also have more than one pump. The pump takes in the oil from a tank particularly via a suction filter. Oil that is not needed in the lubricating cooling system can be returned directly to the pump via the return valve. This is more beneficial in an energetic manner than to guide the excess oil into the tank, from which the pump then would have to suck it in again. The first cooling slide is particularly designed in such a manner that the return channel is closed when the second cooling channel is open and the second cooling channel is closed when the return channel is opened.

The additional oil channel, via which an additional oil volume flow can flow into the lubricating cooling system, can be opened and closed. A particularly high oil amount can thereby selectively be fed into the lubricating cooling system, whereby no further component is necessary for the opening and closing of the additional oil channel.

The additional oil channel extends to the first or second cooling oil channel for cooling the start-up clutch. The additional oil volume flow can thereby be supplied directly to the start-up clutch and the start-up clutch can thus be supplied with a particularly high volume flow for cooling, so that an overheating of the start-up clutch can safely be avoided.

Preferably, the lubricating cooling system has a second actuatable cooling slide, by means of which an oil volume flow in the first cooling channel can be adjusted. The actuation particularly takes place via a control pressure, which is for example adjusted by an electromagnetic valve. The second cooling slide is particularly designed in such a manner that the oil volume flow available for the cooling and the lubrication can be divided into a partial volume flow in the first cooling channel for the start-up clutch and into further partial volume flows for example to the wheel set of the transmission and/or for the electronic control.

In an arrangement of the invention, the second cooling slide is actuated by a second actuatable valve, particularly a magnetic valve, with a second cooling control pressure, which has a main function deviating from the adjustment of the second cooling pressure within the hydraulic control device. The first cooling slide is particularly actuated with a first cooling control pressure by a first actuatable valve, particularly a magnetic valve, which has a main function deviating from the adjustment of the first cooling pressure within the hydraulic control device. Actuatable valves, particularly magnetic valves can be saved thereby, which provides for a cost-efficient hydraulic control device. The mentioned actuatable valves particularly have the main object to select one of several shift devices of the transmission, which shall be applied with an actuation pressure during a shift. The multiple uses of the actuatable valves can for example be achieved by the use of different pressure levels for the different objects.

In an arrangement of the invention, the hydraulic control device has a gear actuation system with a first and a second gear slide, which are respectively assigned to a first and a second shift device of a first partial transmission. An actuation pressure can be applied to the respectively assigned shift device by means of a gear slides. For this, the associated gear slide has to be brought into a corresponding position by means of a gear control pressure and a shift device has to be chosen in such a manner. By means of a first and a second actuatable gear valve, particularly in the form of magnetic valves, which are respectively assigned to the first and the second gear slide, a first or a second gear control pressure can be adjusted at the first or second gear slide. The second gear control pressure of the second gear slide thereby counteracts the first gear pressure at the first gear slide, whereby the first gear slide can be blocked by the second control pressure.

It is thereby ensured that, as soon as the second shift device is selected by means of a corresponding adjustment of the second gear control pressure that the first shift device can no longer be selected. It is thus prevented in a simple manner that the first shift device is also still subsequently selected after the selection of the second shift device and two gears of the first partial transmission are thus engaged. The gear actuation system is particularly designed in such a manner that the second gear slide can be blocked by the first control pressure. In the case that the geared transmission is designed as a dual clutch transmission, the shift devices of a second partial transmission present then have corresponding blocks.

A safe blocking of the gears of a partial transmission is thereby achieved in a simple manner. Additionally, further functions within the control device can also be realized by means of the gear control pressures. For example, the first gear control pressure can be increased after the second shift device was selected by means of the second gear control pressure, without the first shift device having to be selected additionally to the second shift device. The behavior of a lubricating cooling system can thereby for example be influenced in this state by means of the first gear control pressure.

The gear actuation system is designed according to the invention in such a manner that the second shift device is selected when the second gear control pressure exceeds a first pressure threshold. The second gear control pressure acts against a spring, so that the respective pressure limit results by the properties of the spring. When exceeding a second pressure threshold by the second gear control pressure, an adjustment of an actuation pressure at the first shift device (18) is no longer possible by means of the first gear control pressure. The second pressure threshold can be the same or smaller than the first pressure threshold. A safe blocking of the first shift device is enabled thereby.

The first gear control pressure particularly acts against a spring. Thereby, not only the second gear control pressure, but also the spring force acts against the first gear control pressure. A lower amount of the second gear control pressure is thereby sufficient to prevent a selection of the first shift device.

In an arrangement of the invention, the first gear slide of the gear actuation system is designed in such a manner that a first effective area of the first gear control pressure is smaller than a second effective area of the second gear control pressure. A lower amount of the second gear control pressure is thereby sufficient to prevent a selection of the first shift device.

The mentioned spring and/or the area ratio of the first and second effective areas are particularly designed in such a manner that, with the adjustment of the minimum pressure as second gear shift control pressure necessary for the selection of the second shift device, the maximum adjustable first gear shift control pressure is not sufficient to additionally select the first shift device.

In a particular arrangement according to the invention, the gear actuation system has a ratchet device, which arrests a position of the shift devices when an actuation pressure is not present. As a result, an actuation pressure is not necessary for maintaining an adjusted position. Thereby, uncontrollable changes of the positions of the shift devices that are not selected are prevented on the one hand and no pressure has to be applied for maintaining the position of the selected shift device on the other hand, which would detrimentally affect the efficiency of the control device. The respective gear shift control pressure of the selected shift device however remains unchanged, in order to ensure the described blocking in this manner. The ratchet device can for example be arranged directly at the gear slide or also at a shift fork.

The invention will become more readily apparent from the following description of several embodiments of the invention with reference to the accompanying drawings, in which the same or functionally the same elements are provided with identical reference numerals.

Figure 1:
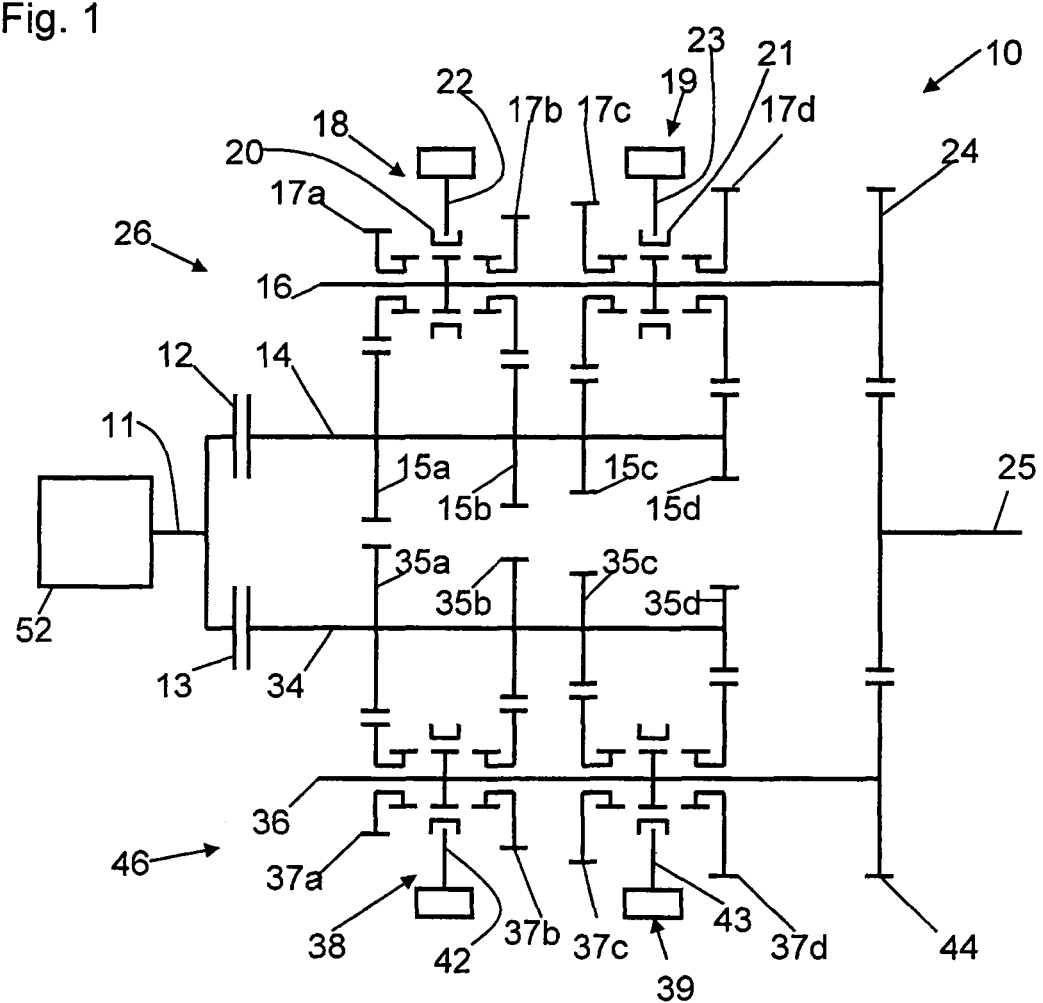
FIG. 1 shows schematically depiction of a dual clutch transmission of a motor vehicle.

According to FIG. 1, an automated transmission in the form of a dual clutch transmission 10 for a motor vehicle with 7 forward and one reverse gear are connected to a drive machine 52 for example in the form of an internal combustion engine via a drive shaft 11. The drive shaft 11 is in operative connection with a first and a second clutch 12, 13. The clutches 12, 13 serve as start-up clutches and are particularly designed as wet friction clutches, which can be actuated hydraulically. The clutch 12 is additionally in operative connection with a first transmission input shaft 14, on which are arranged four fixed gears. A first countershaft 16 is arranged parallel to the first transmission input shaft 14, on which countershaft are mounted four idler gears 17*a* to 17*d* in a rotatable manner, which respectively cog with the fixed wheels 15*a* to 15*d* of the first transmission input shaft 14. The idler gears 17*a*, 17*b* can be coupled to the countershaft 16 in a rotationally fixed manner by means of a first shift device 18 and the idler gears 17*c*, 17*d* by means of a second shift device 19. The shift devices 18, 19 have sliding collars 20, 21 by means of whose displacement in the axial direction of the countershaft 16 the couplings between the idler gears 17*a* to 17*d* with the countershaft can be made and separated in a known manner. The sliding collars 20, 21 can be displaced by shift forks 22, 23. Four gears of the dual clutch transmission 10 can thereby be formed or engaged or disengaged. The first countershaft 16 is connected to an output shaft 26 of the dual clutch transmission 10 via a first output gear wheel 24.

The first transmission input shaft 14, the fixed gears 15*a* to 15*d*, the countershaft 16, the idler gears 17*a* to 17*d* and the first output gear wheel 24 thereby form a first partial transmission 26 of the dual clutch transmission 10.

In the same manner, a second transmission input shaft 34, fixed gears 35*a* to 35*d*, a countershaft 36, idler gears 37*a* to 37*d* and a second output gear wheel 44 form a second partial transmission of the dual clutch transmission 10, which is connected to the second clutch 13. The four gears formed therewith can be engaged with and disengaged from the countershaft 36 via a third and a fourth shift device 38, 39 and associated shift forks 42, 43.

Figure 2:
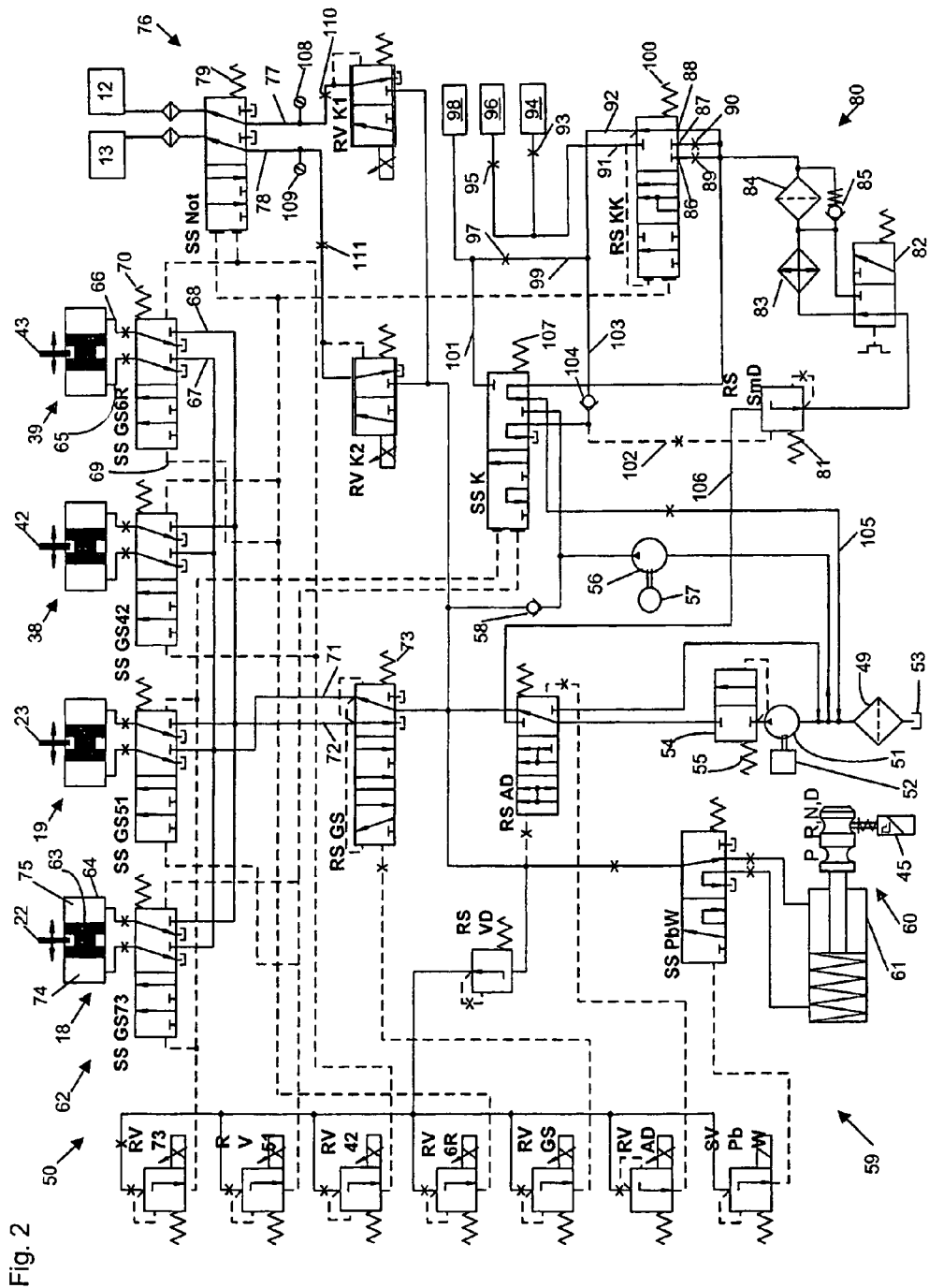
FIG. 2 shows a circuit diagram of a control device of a dual clutch transmission in the form of a hydraulic control device.

The clutches 12, 13 and the shift devices 18, 19, 38, 39 are controlled by a control device in the form of a hydraulic control device, whose circuit diagram is shown in FIG. 2.

According to FIG. 2, the hydraulic control device 50 has a main pump 51, which is driven by the drive machine 52 of the motor vehicle. The main pump 51 sucks in oil from a tank 53 via a suction filter 49. The tank symbol is used at many locations of the circuit diagram. The tank symbol then always has to be understood that the associated line extends to the tank.

A separation valve 54 is arranged on the output side of the main pump 51. As long as the main pump 51 has not built up a sufficient pressure of about 1-1.5 bar, the separation valve 54 separates the main pump 51 from the remaining hydraulic system. The pump pressure is used as separation control pressure for this, which acts against a spring 55. Only when the pump pressure is large enough to overcome the spring force, the separation valve 54 is displaced from the shown position and the connection between the main pump 51 and the remaining hydraulic system is made. The separation valve 54 serves on the one hand to prevent an oil flow in the direction of the main pump 51 and on the other hand to ensure a necessary start-up behavior of the main pump 51.

A work pressure slide RS AD is arranged behind the separation valve 54, by means of which slide a work pressure can be adjusted in the hydraulic system. The work pressure slide RS AD is designed in the form of a 4/3 valve, thus a valve with 4 connections and 3 positions. The work pressure slide RS AD is connected to the separation valve 54 via a first connection. A second connection extends to the suction side of the main pump 51. Excess oil can be fed back directly to the main pump 51 via this connection. A third connection leads to a high pressure system, in which the work pressure is present, and a fourth connection to a lubricating cooling system 80.

A work control pressure together with a spring force acts on the work pressure slide RS AD against the pressure in the return line. The work control pressure is adjusted by a magnetic control valve RV AD, which is controlled by an electronic control, not shown, as are all other magnetic valves. By adjusting the work control pressure, a desired work pressure can be adjusted between about 3 and 25 bar. The work pressure slide takes up a corresponding position herefor.

In the shown first position of the work pressure slide RS AD, the main pump 51 only feeds into the high pressure system, the two other connection do not have a connection. The work pressure slide RS AD assumes this first position, if the required work pressure is larger than the supplied actual work pressure. This position results when particular if the main pump 51 does not deliver a sufficiently high supply performance. The high pressure system has priority over the lubricating cooling system 80. If the work pressure is sufficiently high, the work pressure slide RS AD is displaced into the second position, in which the main pump 51 feeds into the high pressure system and into the lubricating cooling system 80. Backflow to the suction side of the main pump 51 does not take place. If the work pressure is too high, the work pressure slide RS AD is displaced into the third position, in which all connections are connected to each other and a backflow to the suction side of the main pump can thus additionally also take place. By fast changes of the different positions, the required work pressure can be controlled.

The hydraulic control device 50 has an additional pump 56 in addition to the main pump 51, which additional pump is driven by an electric motor 57. The electric motor 57 is accessed by the electronic control. The operation of the additional pump 56 is thereby independent from the operating state of the drive machine 52 of the motor vehicle. The additional pump 56 also sucks oil via the suction filter 49 and supplies it to the high pressure system via a non-return valve. The non-return valve 58 is arranged in such a manner that an oil flow in the direction of the additional pump 56 is blocked. The additional pump 56 is connected to the third connection of the work pressure slide RS AD and thus also to the return to the work pressure slide. The separation valve 54 ensures that the oil supplied from the additional pump 56 cannot flow off in the direction of the main pump 51. The additional pump 56 can additionally also feed oil into the lubricating cooling system 80.

The additional pump 56 can support the main pump 51 with the oil supply of the hydraulic control device 50; the main pump can thereby be smaller. The additional pump 56 can particularly also ensure the oil supply when the drive machine 52 of the motor vehicle and thus also the main pump 52 are at standstill. A so-called start-stop operation of the motor vehicle is enabled made possible thereby.

From the work pressure, a constant supply pressure of about 6.5 bar is discharged via a supply pressure slide RS VD for supplying oil to the magnetic valve of the hydraulic system 50 and is directed to the magnetic valves.

The hydraulic system 50 has a parking lock actuation system 59, by means of which a parking lock 60, only shown schematically can be engaged and disengaged. By means of the parking lock 60, a form-fit connection between an output shaft and a housing of the dual clutch transmission can be made in a known manner and movement of the motor vehicle can thus be prevented. The parking lock actuation system 59 has a parking lock slide SS PbW in the form of a 5/2 valve. In the first shown position, a first side of a cylinder 61 of the parking lock 60 acting in a dual manner is connected to the work pressure. The parking lock 60 is disengaged therewith, which is indicated by the associated drive stages R, N, D. In the second position of the parking lock slide SS PbW, the other, second side of the cylinder 61 acting in a dual manner is connected to the work pressure, so that the parking lock 60 will be or is engaged. This is indicated with the associated drive stage P. The side of the cylinder 61 acting in a dual manner, which is not connected to the work pressure, is respectively connected to the tank via the parking lock slide SS PbW. For adjusting the two positions of the parking lock slide SS PbW, a parking control pressure acts on the parking lock slide SS PbW, which is adjusted by a magnetic shift valve SV PbW.

The current position of the parking lock can be locked with a holding device 45. The holding device 45 is actuated in an electromagnetic manner, wherein it arrests the current position of the parking lock 60 in the non-actuated state. The parking lock 60 is designed in such a manner that, as long as the designed position is not arrested by means of the holding device 45, in a pressureless state, the parking lock actuation system 59 is engaged, that is, the drive stage P is activated. If the parking lock is to be disengaged, which can for example be initiated by the driver by means of a selection lever, the holding device is actuated first and the arresting of the drive stage P is thus cancelled. The parking lock can subsequently be disengaged by the parking lock actuation system 59. After the disengagement, the parking lock 60 is locked in the disengaged position by means of the holding device 45. The holding device 45 is supplied with electrical energy by a separate current supply, for example a battery, not shown, so that an actuation of the holding device 45 can still be actuated even with an onboard network supply that does no longer function and a change of the drive stage can thus be enabled. If the parking lock actuation system 59 is pressureless at this moment, the parking lock is engaged as described above and the motor vehicle cannot be moved any longer. The parking block 60 can thereby also be engaged with a standing main pump 51.

The additional pump 56 and the parking lock actuation system 59 are designed in such a manner that the oil volume flow fed by the additional pump 56 is sufficient to build up a pressure in the hydraulic system 50, which is sufficient to engage the parking lock 60. The pressure necessary for this is for example in a region between 4 and 10 bar, wherein the additional pump 56 can for example supply an oil volume flow of between about 2 and 8 l/min. It is thereby possible to actuate and thus to open the parking lock 60 also without oil from the main pump 51, for example when the drive machine 52 is shut down. Possible mechanical solutions, which enable a disengagement of the parking lock in such a case, are thus not necessary. Such a design of additional pump and parking lock actuation system is independent of the other parts of the hydraulic control device and can also be used in hydraulic control devices designed differently and in connection with different transmission systems, as for example automated shift transmissions, automatic transmissions with planetary gears or stepless transmissions.

The hydraulic system 50 additionally has a gear shift actuation system 62, by means of which the shift devices 18, 19, 38, 39 can be actuated and the different gears of the dual clutch transmission can thus be engaged and disengaged by the described displacement of the shift forks 22, 23, 42, 43. The shift forks 22, 23, 42, 43 are also shown in FIG. 2. The shift devices 18, 19, 38, 39 are constructed in a virtually identical manner, so that, due to reasons of the overview, respectively only one reference numeral is given per component and shown in the figure representative for all shift devices 18, 19, 38, 39.

The shift forks 22, 23, 42, 43 are respectively in operative connection with pistons 63, which are arranged in a displaceable manner within cylinders 64. The pistons 63 and the cylinders 64 thus form a left pressure chamber 74 and a right pressure chamber 75. The left pressure chamber 74 is connected to a left actuation pressure line 65, the right pressure chamber 75 to a right actuation pressure line 66. By feeding oil into the left or right pressure chamber 74, 75, the pistons 63 can be subjected to an actuation pressure on both sides, so that they can be moved in a first and a second direction into opposite outer and a center position. In an outer position, the sliding collar assigned to the respective shift device is brought into a shifted position by means of the associated shift fork, so that one of the two idler gears assigned to the respective shift device is coupled to a countershaft and a gear is thus engaged. In the center position of the pistons 63, the associated sliding collar is also in a central neutral position, so that no gear is engaged by the sliding collar in this position. The first shift device 18 can thus either shift a 3rd or a 7th gear, the second shift device 19 a 1st or a 5th gear, the third shift device 38 a 2nd or 4th gear and the fourth shift device a reverse gear or a 6th gear. As shown in FIG. 1, the gears 3, 7, 1 and 5 are thereby assigned to the first partial transmission 26 and the gears 2, 4, 6 and the reverse gear to the second partial transmission 46. The shift devices 18, 19, 38, 39 have ratchets, not shown in FIG. 2, which ensure that an adjusted position of the pistons 63 can also be maintained without a further pressure application. A possible design of a ratchet is shown in FIG. 3.

Figure 3:
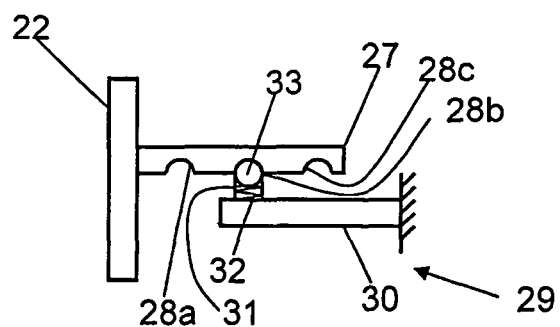
FIG. 3 shows a ratchet device of a shift device of a dual clutch transmission.

In FIG. 3, a ratchet device at the shift fork 22 of the first shift device is shown in an exemplary manner. A first arm 27 is arranged at the shift fork 22 in such a manner that a right angle results between the shift fork 22 and the first arm 27. The first arm 27 has three semicircular recesses 28a, 28b, 28c. A second arm 30 arranged fixed a spring 32 is arranged in the sleeve 31, which spring presses a ball 33 against the first arm 27. The recesses 28a, 28b, 28c are arranged on the first arm 27 in such a manner, that in the cases, in which the pistons 63 of the shift devices and the shift fork 22 are in one of the two outer or the central position, the ball 33 is pressed into one of the recesses 28a, 28b, 28c. The shift fork 22 is thereby fixed in these cases and the respective position is also stable without an actuation pressure on the piston 63 of the shift devices and thus arrested.

According to FIG. 2, a first, a second, a third and a fourth gear slide SS GS73, SS GS51, SS GS42 and SS GS6R are assigned to the shift devices 18, 19, 38, 39. The gear slides SS GS73, SS GS51, SS GS42 and SS GS6R are 6/2 valves. In a first position of the gear slides SS GS73, SS GS51, SS GS42 and SS GS6R, the left and the right actuation pressure lines 65, 66 are connected to the tank. In a second position of the gear slides SS GS73, SS GS51, SS GS42 and SS GS6R, the left and the right actuation pressure lines 65, 66 are connected to respectively a first and a second supply input 67, 68. An oil pressure can be applied to the first or second supply input 67, 68, which can act via the gear slides SS GS73, SS GS51, SS GS42 and SS GS6R and the actuation pressure lines 65, 66 on the pistons 63.

The adjustment of the gear slides SS GS73, SS GS51, SS GS42 and SS GS6R takes place via in each case one gear shift valve in the form of a magnetic control valve RV73, RV51, RV42, RV6R, which respectively applies a gear control pressure to the respective assigned gear slides SS GS73, SS GS51, SS GS42 and SS GS6R. The gear slides SS GS73, SS GS51, SS GS42 and SS GS6R respectively have a control pressure input 69 for this, which is connected to the associated magnetic control valve RV73, RV51, RV42, RV6R. A spring 70 counteracts the respective gear control pressure, which spring tends to press the gear slide SS GS73, SS GS51, SS GS42 and SS GS6R into the mentioned first inactive position. By an adjustment of a sufficiently high gear shift control pressure, which is about 3 bar with the gear slides SS GS73, SS GS51 and about 5 bar with the gear slides SS GS42, SS GS6R, a shift device can be selected and thereby be activated and the associated piston 63 can be subjected to pressure via one of the two actuation pressure lines 65, 66 and one of the two supply lines 67, 68.

So that not both shift devices 18, 19 or 38, 39 of the partial transmission 26, 46 are activated simultaneously and thus possibly two gears are engaged in one partial transmission 26, 46, a mutual blocking of the shift devices 18 and 19 or 38 and 39. The blocking also permits the gear control pressures to fulfill additional functions.

The blocking of the first shift devices 18 by the second shift device 19 is realized in that the second gear control pressure, which is generated by the magnetic control valve RV51 and mainly serves the second shift device, is applied to the first gear slide SS GS73 in such a manner that it additionally counteracts the first gear shift control pressure, which is generated by the magnetic control valve RV73 in addition to the spring force. The first gear shift control pressure thereby acts on a first effective area and the second gear shift control pressure acts on a second effective area. The second effective area of the second gear shift control pressure at the first gear slide GS SS73 is thereby larger than the first effective area of the first gear shift control pressure. As the spring force additionally acts against the gear control pressure, the first shift device 18 can, as soon as the second gear shift control pressure has reached a pressure threshold, no longer be activated by the first gear shift control pressure. The mentioned pressure threshold is in any case reached when the second shift device 19 is activated.

The blocking of the second shift device 19 by the first shift device 18 is analogously realized in that the first gear shift control pressure, which is generated by the magnetic control valve RV73 and mainly serves for the activation of the first shift device 18, is applied to the second gear slide SS GS 51 in such a manner that it counteracts the second gear shift control pressure generated by the magnetic control valve RV 51 in addition to the spring force. Regarding the effective areas of the gear shift control pressures at the gear slide GS SS51, the same is valid as with the gear slide GS SS73.

The first and the second shift device 18, 19 thereby block mutually.

A blocking of the third and the fourth shift device 38, 39 of the partial transmission 46 is designed analogously hereby. The only difference is that, with the gear slides SS GS42 and SS GS6R, the mentioned first and second effective areas of the gear shift control pressures are the same. A safe blocking is achieved in these cases by a corresponding design of the spring 70. The applied spring force is in particular higher than that of the gear slides SS GS 73 and SS GS51.

The oil pressures at the first and second supply inputs 67, 68 of the gear shift slides SS GS73, SS GS51, SS GS42 and SS GS6R are adjusted by a supply valve in the form of a supply pressure slide RS GS. The supply pressure slide RS GS is designed as a 5/3 valve, which has two supply outputs 71, 72, which are respectively connected to the supply inputs 67, 68 of the gear shift slides SS GS73, SS GS51, SS GS42 and SS GS6R. In addition to two outflows to the tank, the supply pressure slide RS GS still has a connection to the work pressure slide RS AD, via which it is supplied with work pressure. In the first shown position of the supply pressure slide RS GS, work pressure is applied to the first supply input 67 of the gear shift slides SS GS73, SS GS51, SS GS42 and SS GS6R. With a corresponding position of the gear shift slides SS GS73, SS GS51, SS GS42 and SS GS6R, a piston 63 of the shift devices 18, 19, 38, 39 could thereby be displaced to the right with regard to FIG. 2. In a second center position of the supplies applied to pressure slide RS GS, both supply inputs 67, 68 of the gear shift slides SS GS73, SS GS51, SS GS42 and SS GS6R are connected to the tank. Thereby, no actuation pressure can act on the piston 63. In a third position of the supply pressure slide RS GS, the second supply input 68 of the gear shift slides SS GS73, SS GS51, SS GS42 and SS GS6R is subjected to work pressure. With a corresponding position of the gear shift slides SS GS73, SS GS51; SS GS42 and SS GS6R, a piston 63 of the shift devices 18, 19, 38, 39 could thereby be displaced to the left with regard to FIG. 2. By means of the center position of the supply pressure slide RS GS it is ensured that pressure can never be present simultaneously at both supply pressure inputs 67, 68 of the gear shift slides SS GS73, SS GS51, SS GS42 and SS GS6R. The supply pressure slide RS GS can thus guide the work pressure as supply pressure optionally to one of the two supply outputs 71, 72.

The control of the supply pressure slide RS GS takes place by a supply valve in the form of a magnetic control valve RV GS, which applies a supply control pressure on the supply pressure slide RS GS. The supply control pressure acts against a spring 73, which is arranged in such a manner that it presses the supply pressure slide RS GS into the mentioned first position. The pressures at the supply outputs 71, 72 are additionally fed back to the supply pressure slide RS GS. The pressure at the supply output 71 thereby acts in the same direction as the supply control pressure and the pressure at the supply output 72 in the same direction as the spring 73. The supply pressure slide RS GS is thereby designed as a regulation slide, whereby a target pressure can be regulated at one of the supply inputs 71, 72, which is given by the supply control pressure.

Figure 4:
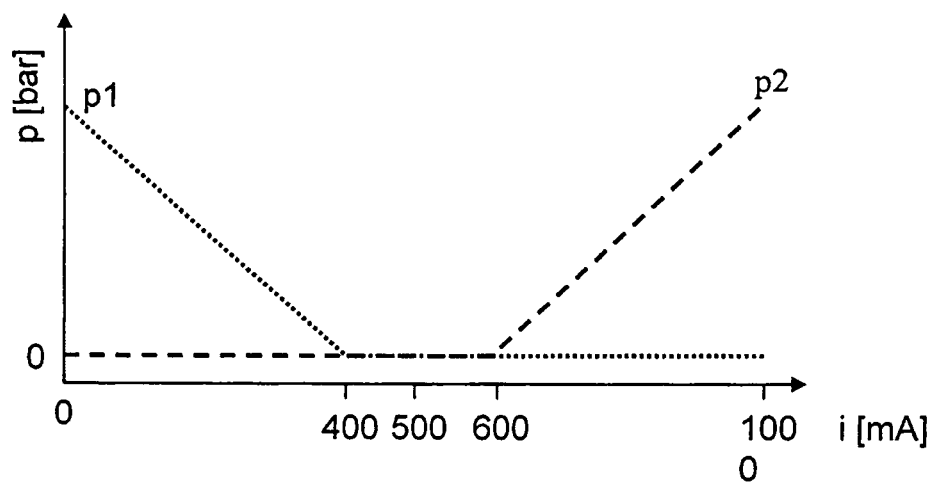
FIG. 4 shows characteristic lines of a supply pressure slide of the hydraulic control device and FIG. 5 shows pressure patterns with a function check of an emergency slide of the hydraulic control device.

In FIG. 4 the resulting characteristic lines of the supply pressure slide RS GS are shown schematically via an access current of the regulation magnetic valve RV GS. It is thereby assumed that the regulation magnetic valve RV GS has an increasing characteristic line and that the current pressure characteristic line of the magnetic control valve RV GS is ideally an origin line. In FIG. 4, the pressure at the first supply output 71 is called p1 (dotted line) and the pressure at the second supply output 72 is called p2 (dashed line). With a control current of 0 mA, a maximum value of for example 20 bar is obtained for the pressure at the first supply output 71. Assuming that the work pressure has at least that height, this pressure is regulated by the supply pressure slide RS GS by possibly necessary changes between the mentioned first and second position. The pressure at the second supply output 72 is thereby 0. With an increasing control current, the regulated pressure at the first supply output 71 falls proportionally, which is why the return of this pressure in the same direction as the supply control pressure is necessary. The pressure at the first supply output 71 reaches the value 0 with a control current of about 400 mA and remains constantly at 0 even with a further increasing control current. The pressure at the second supply output 72 remains constant at 0 up to a control current of about 600 mA and increases then proportionally with an increasing control current. The return of the pressure at the second supply output 72 therefore also has to take place in the opposite direction of the supply control pressure. The target pressure at the second supply output 72 given by the supply control pressure is regulated by the supply pressure slide RS GS by possibly necessary changes between the mentioned second and third positions. If the control current lies approximately between 400 and 600 mA, the supply pressure slide RS GS is in the mentioned second position and no pressure is present at any of the supply outputs 71, 72. Thereby, a certain pressure can be provided either at the first or the second supply output 71, 72 by means of the supply pressure slide RS GS.

By means of a corresponding control of the supply pressure slide RS GS, the movement direction of a selected piston 63 of a shift device 18, 19, 38, 39 and thereby the shift direction can be selected. The height of the actuation pressure on the pistons 63 can also be adjusted or regulated.

For carrying out a shift in the dual clutch transmission 10, a shift direction is thereby selected by a corresponding access of the magnetic control valve RV GS via the supply pressure slide RS GS and a desired supply pressure is regulated for the gear slides SS GS73, SS GS51, SS GS42 and SS GS6R. By a corresponding access of the regulation magnetic valves RV73, RV51, RV42, RV6R, a shift device 18, 19, 38, 39 is additionally selected via the gear slides SS GS73, SS GS51, SS GS42 and SS GS6R, wherein it is impossible by means of the blocking to simultaneously select both shift devices 18, 19 or 38, 39 of a partial transmission 26, 46. By means of a corresponding adjustment of the gear shift control pressure of the selected gear slide, a through-flow amount through the gear slide into the selected pressure space 74, 75 can be controlled. It is thereby possible to vary the speed of the piston 63 during the shifting. With the possibility to adjust the supply and thus the actuating pressure and also to control the flow-through amount into the pressure chamber 74, 75, the shift pattern in the dual clutch transmission 10 can be given in an exact manner.

The hydraulic system 50 additionally has a clutch control system 76, by which the clutches 12, 13 can be actuated, that is, applied with an actuation or clutch pressure. The clutches 12, 13 can thereby be closed and opened or also be held in a defined slip position.

The clutch control system 76 is also supplied with work pressure from the work pressure slide RS AD. A first clutch slide RV K1 is assigned to the first clutch 12 and a second clutch slide RV K2 is assigned to the second clutch, which are both supplied with work pressure. The clutch sliders RV K1 and RV K2 are directly accessed regulation slides, which are controlled by the electronic control. The clutch sliders RV K1 and RV K2 are designed as 3/2 valves and can regulate a desired clutch pressure at the first and second clutch 12, 13 via respectively a first and second clutch line 77, 78. The clutch lines 77, 78 can thereby either be connected to the work pressure or to the tank.

An emergency slide SS Not is arranged between the clutch sliders RV K1 and RV K2 and the clutches 12 and 13, by means of which emergency slide the clutch lines 77, 78 can be separated into an emergency position of the emergency slide SS Not and the clutches 12 and 13 can be connected to the tank. In this case, the clutch pressure at the clutches abruptly falls to zero and the clutches 12 and 13 are thereby opened. The electronic control can thereby for example initiate an emergency opening upon recognizing an error in the dual clutch transmission 10 and abruptly open the clutches 12 and 13. The emergency slide SS Not is designed as a 6/2 valve, on which an emergency control pressure acts against a spring 79. If the force acting as a result of the emergency control pressure is smaller than the force of the spring 79, the emergency slide SS Not is pressed into the shown position, the normal position, in which the connection between the clutch slides RV K1, RV K2 and the clutches 12, 13 is made.

The gear control pressure of the gear slides SS GS42 and SS GS6R act together as the emergency control pressure, which slides primarily serve for the selection of one of the shift devices 38, 39 of the second partial transmission 46. The effective area of the emergency control pressure and the spring 79 are designed in such a manner that the maximum gear shift control pressure of one of the two gear slides SS GS42 and SS GS6R is alone not sufficient to displace the emergency slide SS Not from the shown position and to release an emergency opening. For releasing an emergency opening, the two associated magnetic control valves RV 42 and RV 6R thus have to be activated. The design is in particular such that both regulation magnetic valves RV 42 and RV 6R have to supply nearly their maximum pressure.

A design would also be possible, where a gear shift control pressure alone could release an emergency opening. In this case, the necessary pressure for the emergency opening would have to be clearly above the pressure necessary for an activation of the corresponding shift device. For example, a pressure of 3 bar could be sufficient for an activation of the shift device, and a pressure of 5 bar could be necessary for an emergency opening. In this case, only one gear shift control pressure could be directed to the emergency slide as emergency control pressure.

The emergency slide SS Not is never shifted during normal operation of the dual clutch transmission. Thereby, the danger exists that a possible defect at the emergency slide SS Not would only be determined if an emergency opening is to take place. In order to avoid this, a functional check of the emergency slide SS Not carried out by the electronic control. For this, a pressure build-up behind the first and/or second clutch slide RV K1 and RV K2 is compared with the two positions of the emergency slide SS Not in a neutral position of the dual clutch transmission 10, that is, a state, in which no gear is engaged in the dual clutch transmission 10, for example in the transmission stage N or P. For this, a clutch actuation pressure is increased abruptly from zero to a fixed value. The pressure pattern necessary for the comparison can be measured by means of pressure sensors 108, 109, which are respectively arranged between the first and the second clutch slide RV K1, RV K2 and the emergency slide SS Not.

If the emergency slide SS Not is in the emergency position, the clutch lines 77, 78 are closed by the emergency slide SS Not. In the normal position however, the clutch lines 77, 78 are connected to pressure chambers, not shown, of the clutches 12, 13. Oil that is fed in the normal position of the emergency slide Not from the clutch slides RV K1 and RV K2 to the clutch lines 77, 78 can thereby distribute itself to a clearly higher volume. The pressures in the clutch lines 77, 78 in the normal position of the emergency slide SS Not thereby increase slower or more slowly than in the emergency position. So that the pressure build-up is clearly distinguished with the two positions of the emergency slide SS Not, in particular no throttles should be arranged between the pressure sensors 108, 109 and the clutches. A throttle arranged at this position would hinder the oil flow into the clutches 12, 13 in the normal position of the emergency slide SS Not and thus generate a back pressure. This back pressure would be measured by the pressure sensors 108, 109. The difference with the pressure build-up in the two positions would thereby only be small and could possibly not be recognized safely. For this reason, throttles 110 and 111 are respectively arranged between the pressure sensors 108, 109 and the clutch slides RV K1 and RV K2.

The throttles can also be arranged between the work pressure slide RS AD and the clutch slides RV K1 and RV K2. It is also possible that the throttles are arranged in such a manner that they are respectively arranged between branch-offs of the return lines of the clutch slides RV K1 and RV K2 and the clutch slides RV K1 and RV K2.

For the functional check of the emergency slide SS Not, the clutch slides RV K1 and RV K2 are first set to the normal position of the emergency slide SS Not and subsequently with an identical signal to an emergency position of the emergency slide SS Not. The pressure pattern or the pressure build-up with the two accesses is subsequently compared. If the pressure build-up is faster or steeper with an indicated emergency position of the emergency slide SS Not, the adjustment of the emergency position was successful and the function of the emergency slide SS Not is ensured. A simple method for determining a variable for the different gradients is to measure the time span up to reaching a certain pressure value. If the difference between the time span is with an indicated normal position is longer by and adjustable period than the time span with an accessed emergency position, it is concluded therefrom that the emergency slide SS Not actually has taken up the desired emergency position. For the functional check it is sufficient to only compare the pressure build-up of a pressure and correspondingly to send a signal only access one clutch slide RV K1 or RV K2.

Figure 5:
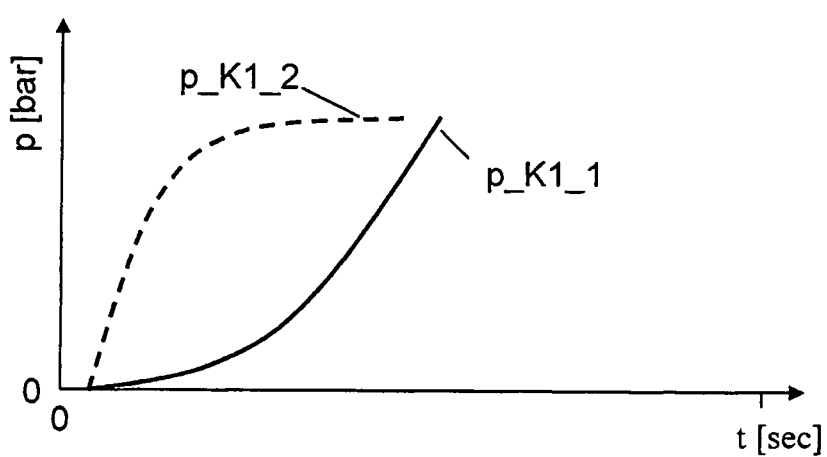

FIG. 5 shows two pressure patterns of the pressure between the first clutch slide RV K1 and the emergency slide SS Not over time in an exemplary manner. The continuous line (p_K1_1) shows the pressure build-up with a normal position of the emergency slide SS Not, the dashed line (p_K1_2) the pressure build-up for an emergency position. As can be seen clearly, the pressure with the normal position of the emergency slide SS Not increases clearly slower and more smoothly. The pressure build-up with the normal position has a principally concave pattern and the pressure build-up in the emergency position a principally convex pattern. The electronic control can recognize therewith that the indicated emergency position was actually set and the emergency thus functions.

The lubricating cooling system 80 of the hydraulic system 50 is mainly supplied with oil by the work pressure slide RS AD via its fourth connection via a supply channel 106. This oil is guided to a lubricating pressure slide RS SmD, which controls a lubricating pressure in the lubricating cooling system. The height of the lubricating pressure depends on the one hand on the design of a spring 81, which acts against the returned lubricating pressure and on the other hand on a lubricating control pressure, which also acts against the spring 81. The spring 81 is for example designed in such a manner that a lubricating pressure of about 3.5 bar is obtained without an additional lubricating control pressure. The adjustment of the lubricating control pressure is described below.

From the lubricating pressure slide, the oil reaches a thermostat valve 82 known per se, by which the oil is conducted in dependence on an oil temperature, either over an oil cooler 83 or directly to an oil filter 84 arranged behind the oil cooler 83. For the faster heating of the dual clutch transmission 10, the oil cooler 83 is bypassed at low oil temperatures. Parallel to the oil filter 84, a non-return valve is arranged in such a manner that the oil can also flow over the non-return valve 85 past the oil cooler 84 when a certain back pressure in front of the oil filter 84 is exceeded.

A first cooling slide SS K and a second cooling slide RS K are arranged in parallel behind the oil cooler 84/non-return valve 85, so that both are supplied with oil via the oil cooler 84/non-return valve 85. The second cooling slide RS KK is in the form of a 5/3 valve. Three inputs 86, 87, 88 of the cooling slide RS KK are connected to the oil cooler 84/non-return valve 85, wherein the first input 86 is supplied with oil via a first throttle 89, the second input 87 via a second throttle 90 and the third input directly, that is, without interposition of a throttle. The first throttle 89 thereby particularly has a larger diameter than the second throttle 90.

A first output 91 of the cooling slide RS KK is connected to a cooling system 94 of a set of gears of the dual clutch transmission 10 via a third throttle 93 and to a cooling system 96 of the electronic control via a fourth throttle. A second output of the cooling slide RS KK is connected to a cooling system 98 of the clutches 12, 13 via a first cooling channel 99, in which a fifth throttle 97 is arranged. With the selection of the diameters of the mentioned throttles 89, 90, 93, 95 and 97, the division of the oil flows to the cooling systems can be influenced and designed.

In the first shown position of the cooling slide RS KK, only the third input 88 is connected to the second output 92 and thus to the cooling system 98 of the clutches 12, 13. The other inputs and outputs do not have a connection. Thereby, no oil flows into the cooling systems 94 and 96 in this first position of the cooling slide RS KK. In a second, center position of the cooling slide RS KK, the first and the second input 86, 87 are together connected to the first output 91 and thus to the cooling systems 94 and 96. Additionally, the third input 88 is connected to the second output 92, as in the first position. In a third position, only the second input 87 is connected to the first output 91. In this position, no oil flows to the cooling system 98 of the clutches 12, 13 via the cooling slide RS KK.

The position of the cooling slide RS KK results from a force of a spring 100 against which the returned pressure at the second output 92 of the cooling slide RS KK and a second cooling control pressure. The fourth gear control pressure of the magnetic control valve RV 6R is used as the second cooling control pressure, whose main function is to activate the fourth shift device 39. As about 5 bar are necessary for the activation as described, the pressure area below can be used for controlling the second cooling slide RS KK. With a small second cooling control pressure and a small pressure at the second output 92, the cooling slide RS KK is in the first position. By means of a high second cooling control pressure, the third position can be adjusted. By means of the return of the pressure at the second output 92, a pressure value given by the second cooling control pressure and the spring 100 at the second output 92 and thus in the first cooling channel 99 to the cooling system of the clutches can be regulated.

The first cooling slide SS K is a 6/2 valve without return. It is supplied with an oil volume flow by the oil cooler 84/non-return valve 85. The oil amount available for this depends amongst others on the position of the second cooling slide RS KK. If a lot of oil can flow off via the second cooling slide RS KK, the oil volume flow to the first cooling slide SS K is smaller than in the case in which little oil can flow off via the second cooling slide RS KK. The oil amount flowing off via the second cooling slide RS KK depends on its position. The oil volume flow from the oil cooler 84/non-return valve 85 to the first cooling slider SS K can thus be influenced by means of the second cooling slide RS KK.

In a first shown position of the first cooling slide SS K, the oil coming from the oil cooler 84/non-return valve 85 is conducted to the suction side of the main pump 51 via a non-return valve. Excess oil from the lubricating cooling system 80 can thereby flow directly back into the high pressure cycle. All other connections either have no connection in this position or are connected to the tank. In a second position of the cooling slide SS K, the oil coming from the oil cooler 84/non-return valve 85 is guided to the cooling system 98 of the clutches 12, 13 via a second cooling channel 101, which is arranged in parallel to the first cooling channel 99. The Connection to the suction side of the main pump 51 is interrupted in this case. Additionally, a connection between the additional pump 56 and the lubricating cooling system is made via the first cooling slide SS K in its second position. On the one hand, a possible pressure of the additional pump 56 is guided as lubricating control pressure to the lubricating pressure slide RS SmD via a control channel. If the additional pump 56 builds up an oil pressure, it leads to an increase of the lubricating pressure in the lubricating cooling system 80 and thus also to an increase of the oil amount available for the cooling and lubrication. The oil fed by the additional pump 56 is additionally conducted to the first cooling channel 99 and thus to the cooling system 98 of the clutches 12, 13 via an additional oil channel 103, which partially corresponds to the control channel 102. The A non-return valve 104 is arranged in the oil channel 103 in such a manner that oil can only flow from the additional pump 56 in the direction of the first cooling channel 99. The oil amount available for the cooling of the clutches 12, 13 is thereby increased.

A first cooling control pressure acts on the first cooling slide SS K, which pressure is composed of the first and the second gear control pressure of the magnetic control valves RV 73 and RV 51. These gear control pressures mainly serve for the selection of the first and the second shift device 18, 19 of the first partial transmission 26. The first cooling control pressure acts against a spring 107, which is designed in such a manner that a change from the described first position into the second position of the first cooling slide SS K takes place at a pressure of about 5 bar. As a clearly smaller pressure is sufficient for the selection of the first or second shift device 18, 19, as described above, the selection of a shift device 18, 19 can take place without this having an influence on the position of the first cooling slide SS K.

If the first cooling slide SS K is to be brought into the second position without one of the two shift devices 18 or 19 to be selected, a pressure value of about 2.5-2.7 bar is adjusted as the first and second gear control pressure by the regulation magnetic valves RV73 and RV51. These gear shift control pressures are respectively too small to select the first or second shift device 18 or 19, but together they are sufficient to bring the first cooling slide SS K into the second position.

The lubricating cooling system 80 enables thereby to shift between different cooling types. In a first cooling type, where all cooling systems 94, 96, 98 are supplied with a basic oil amount, the first cooling slide SS K is in a shown first position, so that oil is conducted back from the lubricating cooling system 80 to the suction side of the main pump 51. By means of the of the fourth gear control pressure, which acts at the second cooling control pressure at the second cooling slide RS KK, a desired pressure is regulated in the first cooling channel 99 to the cooling system 98 of the clutches 12, 13. The second cooling slide RS KK is thereby in a regulation position between the described first and second position. The first and the second throttle 89, 90 are particularly designed in such a manner that the largest amount flows back to the main pump 51 and the smallest amount in the direction of the cooling systems 94 and 96.

In a second cooling type, in which the cooling system 12, 13 is not supplied with oil, the first cooling slide SS K is also in the shown first position. The second cooling slide RS KK is placed into the described third position by means of the second cooling control pressure, in which no oil flows into the direction of the cooling system 98 of the clutches 12, 13.

In a third cooling type, in which an increased oil amount is introduced into the cooling system 98 of the clutches 12, 13, the first cooling slide SS K is in the described second position due to a corresponding cooling control pressure. Thereby, no oil is returned from the lubricating cooling system 80 to the suction side of the main pump 51. The oil flowing from the oil filter 84/non-return valve 85 in the direction of the first cooling slide SS is conducted to the cooling system 98 of the clutches 12, 13 via the second cooling channel 101. The distribution of the oil flowing over the second cooling slide RS KK can be adjusted via the second cooling control pressure. The additional pump 56 is thereby not in operation.

A fourth cooling type, in which a very large oil amount is conducted into the cooling system 98 of the clutches 12, 13, is only distinguished from the third cooling type in that the additional pump 56 additionally feeds oil into the lubricating cooling system 80. Thereby, the lubricating pressure is increased as described above by means of the lubricating pressure slide RS SmD, which leads to an increase of the oil amount available in the lubricating cooling system 80. Additionally, oil flows from the additional pump 56 to the cooling system 98 of the clutches 12, 13 via the additional oil channel 13. A maximum oil amount is thereby supplied to the cooling system 98 of the clutches.

The selection of a cooling type by the electronic control mainly takes place based on the cooling requirement of the clutches 12, 13.

What is claimed is:

1. A hydraulic control arrangement for an automated shift transmission, particularly a dual clutch transmission for a motor vehicle, with a lubricating cooling system (80) including and a main lubricant pump (51) and a controllable additional pump (56) which together ensure an oil supply of the hydraulic control arrangement (50), the lubricating cooling system (80) comprising a lubricating pressure slide (RS SmD) for adjusting a lubricating pressure in the lubricating cooling system (80), and the controllable additional pump (56) being connected to a pressure control channel (102) of the lubricating pressure slide (RS SmD) for providing a lubricating fluid control pressure, the lubricating pressure slide (RS SmD) being designed in such a manner that the adjusted lubricating pressure increases with increasing lubricating control pressure, with a lower limit of the lubricating fluid pressure being fixed by a spring (81), the lubricating cooling system (80) including a extending from the main lubricant pump (51) to the lubricating pressure slide (RS SmD) for supplying an oil volume flow from the main lubricant pump (51) to the lubricating cooling system (80) and an additional oil channel (103), via which an additional oil volume flow can be conducted from the controllable additional pump (56) to the lubricating cooling system (80), the pressure control channel (102) of the lubricating pressure slide (RS SmD) extending through at least part of the additional oil channel (103).

2. The hydraulic control arrangement according to claim 1, wherein the lubricating cooling system (80) has a first actuatable cooling slide (SS K), by means of which a connection between the control channel (102) of the lubricating pressure slide (RS SmD) and the controllable additional pump (56) can be made and separated.

3. The hydraulic control arrangement according to claim 2, wherein the first cooling slide (SS K) is actuated by a first actuatable valve (RV 42) with a first cooling control pressure, which has a main function within the hydraulic control device (50) deviating from the adjustment of the first cooling control pressure.

4. The hydraulic control arrangement according to claim 1, wherein the lubricating cooling system (80) has a first cooling channel (99) for cooling a start-up clutch (12, 13) of the automated shift transmission (10) and a second cooling channel (101) arranged parallel to the first cooling channel (99) with a first actuatable cooling slide (SS K) for opening or closing the second cooing channel (99).

5. The hydraulic control arrangement according to claim 4, including a return channel (105) extending from the lubricating cooling system (80) to an intake side of the main lubricant pump (51) of the hydraulic control arrangement (50), via which an oil volume flow can be returned to the main lubricant pump (51), the return channel (105) including the first actuable cooling slide (SSK) for controlling the oil volume flow.

6. The hydraulic control arrangement according to claim 4, wherein the additional oil channel (103), via which an additional oil volume flow can flow into the lubricating cooling system (80) can be closed and opened by means of the first actuable cooling slide (SS K).

7. The hydraulic control arrangement according to claim 6, wherein the additional oil channel (103) is relatively connectable to the first or second cooling channel (101, 99) for cooling the start-up clutch (12, 13).

8. The hydraulic control arrangement according to claim 4, wherein the lubricating cooling system (80) has a second, actuatable cooling slide (RS KK), by means of which an oil volume flow can be adjusted in the first cooling channel (99).

9. The hydraulic control arrangement according to claim 8, wherein the second cooling slide (RS KK) is operable by a second actuatable valve (RV 6R) with a second cooling control pressure, which has a main function within the hydraulic control device (50) different from the adjustment of the second cooling control pressure.

10. The hydraulic control arrangement according to claim 1, wherein the automated shift transmission includes a gear actuation system (62), with
    a first and a second fluid-actuated shift device (18, 19), by means of which respectively one idler wheel (17a, 17b) can be coupled to a shaft (16) and a gear can thus be engaged in the automated shift transmission,
    a first and a second gear slide (SS GS73, SS GS51) which are respectively assigned to the first and the second shift device (18, 19) and by means of which an actuation pressure can be applied to the respectively assigned shift device in dependence on a gear control pressure,
    a first and a second accessible gear shift valve (RV 73, RV 51), which are respectively assigned to the first and the second gear slide (SS GS73, SS GS51) and by means of which respectively a first and a second gear control pressure can be adjusted at the respective assigned gear slide (SS GS73, SS GS51), wherein
    the second gear control pressure of the second gear slide (SS GS73) thereby counteracts the first gear control pressure on the first gear slide (SS GS51) and the first gear slide (SS GS73) can thus be blocked by the second control pressure.

11. The hydraulic control arrangement according to claim 10, wherein
    the gear actuation system (62) is designed in such a manner that the second shift device (19) is selected when the second gear control pressure exceeds a first pressure threshold and
    the first gear slide (SS GS73) of the gear actuation system (62) is designed in such a manner that, when the second gear control pressure exceeds a second pressure threshold by, an adjustment of the actuation pressure at the first shift device (18) is no longer possible by means of the first gear control pressure.

12. The hydraulic control arrangement according to claim 11, wherein the first gear slide (SS GS73) of the gear actuation system (62) has a spring (70), which counteracts the first gear control pressure in addition to the second gear control pressure.

13. The hydraulic control arrangement according to claim 11, wherein the first slide (SS GS73) of the gear actuation system (62) is designed in such a manner that a first effective area of the first gear control pressure gear is smaller than a second effective area of the second gear control pressure.

14. The hydraulic control arrangement according to claim 10, wherein the second gear slide (SS GS51) of the gear actuation system (62) can be blocked by the first gear control pressure.

15. The hydraulic control arrangement according to claim 14, wherein the automated shift transmission includes first and second partial transmissions (26, 41) and the gear actuation system (62) has
    a third and a fourth fluid-actuated shift device (38, 39),
    a third and a fourth gear slide (SS GS42, SS GS6R),
    a third and a fourth accessible valve (RV 42, RV 6R), by means of which a third and a fourth gear control pressure can be adjusted
for actuating the second partial transmission (46) and the third gear slide (SS GS42) can be blocked by the fourth gear control pressure and the fourth gear slide (SS GS6R) can be blocked by the third gear control pressure.

16. The hydraulic control arrangement according to claim 10, wherein the gear actuation system (62) has a ratchet device (29), which arrests a position of the first and second fluid-actuated shift devices (18, 19) when an actuation pressure is not present.

\* \* \* \* \*